(12) United States Patent
Ricks

(10) Patent No.: US 7,266,999 B2
(45) Date of Patent: Sep. 11, 2007

(54) THICK FILM TECHNOLOGY BASED ULTRA HIGH PRESSURE SENSOR UTILIZING INTEGRAL PORT AND DIAPHRAGM CONSTRUCTION

(75) Inventor: Lamar F. Ricks, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/343,519

(22) Filed: Jan. 30, 2006

(65) Prior Publication Data

US 2007/0186661 A1 Aug. 16, 2007

(51) Int. Cl.
*B60C 23/02* (2006.01)
(52) U.S. Cl. .................................... 73/146.5
(58) Field of Classification Search ............... 73/754; 361/283.1
See application file for complete search history.

(56) References Cited

U.S. PATENT DOCUMENTS

| | | | |
|---|---|---|---|
| 4,794,048 A | * 12/1988 | Oboodi et al. ............... 428/432 |
| 4,974,117 A | 11/1990 | Irwin .......................... 361/283 |
| 4,997,698 A | 3/1991 | Oboodi et al. ............... 428/209 |
| 5,499,158 A | 3/1996 | Bishop et al. ............ 361/283.4 |
| 5,525,280 A | 6/1996 | Shukla et al. .................. 264/59 |
| 5,544,399 A | 8/1996 | Bishop et al. .............. 29/25.41 |
| 6,091,022 A | 7/2000 | Bodin ........................ 174/52.5 |
| 6,209,398 B1 | 4/2001 | Fowler, Jr. et al. ............ 73/724 |
| 6,528,340 B2 | 3/2003 | Haji-sheikh et al. ........... 438/53 |
| 6,945,118 B2 | 9/2005 | Maitland, Jr. et al. ......... 73/754 |

* cited by examiner

*Primary Examiner*—Andre J. Allen
(74) *Attorney, Agent, or Firm*—Kermit D. Lopez; Luis M. Ortiz

(57) ABSTRACT

A method and apparatus for configuring a pressure sensor. A homogeneous piece of metal can be provided. A pressure port and a machined diaphragm are integrated onto the homogeneous piece of metal, wherein the machined diaphragm is connected to the pressure port. The machined diaphragm can be configured utilizing Advanced Thick Film (ATF) technology, thereby providing a high-pressure pressure sensor for use in high-pressure sensing application based on the pressure port and the machined diaphragm and related pressure sensor components thereof.

20 Claims, 3 Drawing Sheets

ISOMETRIC VIEW

CROSS SECTION

THICK FILM TECHNOLOGY BASED ULTRA HIGH PRESSURE SENSOR UTILIZING INTEGRAL PORT AND DIAPHRAGM CONSTRUCTION

TECHNICAL FIELD

Embodiments are generally related to sensing devices and methods thereof. Embodiments are also related to pressure transducers. Embodiments are additionally related to pressure sensors. Embodiments are additionally related to ATF (Advanced Thick Film) processes and techniques.

BACKGROUND

Various sensors are known in the pressure sensing arts. Pressure transducers are well known in the art. One example of a pressure transducer is a device formed with a silicon substrate and an epitaxial layer, which is grown on the substrate. A portion of the substrate can then be removed, leaving a thin, flexible diaphragm portion. Sensing components can be located in the diaphragm portion to form a pressure transducer. In operation, at least one surface of the diaphragm can be exposed to a process pressure. The diaphragm deflects according to the magnitude of the pressure, and this deflection bends the attached sensing components. Bending of the diaphragm creates a change in the resistance value of the sensing components, which can be reflected as a change in the output voltage signal of a resistive bridge formed at least partially by the sensing components.

Some techniques for forming a composite diaphragm for a pressure transducer or similar device involve configuring a substrate layer having a first conductivity type, wherein the substrate layer includes a first surface. Positive implants can then be deposited in the first surface of the substrate layer, and an epitaxial layer grown on the first surface of the substrate layer so that the positive implants form positive diffusions in the epitaxial layer. An oxide pattern can be then formed on the epitaxial layer, and a top layer deposited over the epitaxial layer and oxide pattern. The substrate layer and positive diffusions of the epitaxial layer can then be etched to form the composite diaphragm. Such a composite diaphragm can therefore be provided for use in a pressure sensor or like device. The diaphragm comprises a first layer of silicon nitride and a second layer attached to the silicon nitride layer and comprising a pressure sensor pattern of silicon material.

Pressure transducers of the type which comprise a thin, relatively flexible diaphragm portion of suitable material, such as silicon or ceramic, on which either a selected resistive element or a capacitive plate is printed whereby exposure to a pressure source causes deflection of the diaphragm will cause a change in the resistive value of the resistive element or a change in the spacing of the capacitive plate with a mating capacitive plate and concomitantly a change in capacitance are therefore well known in the art.

An example of a transducer configuration is disclosed in U.S. Pat. No. 6,945,118, entitled "Ceramic on Metal Pressure Transducer," which issued to William D. Maitland, Jr. on Sep. 20, 2005 and is incorporated herein by reference. U.S. Pat. No. 6,945,118 generally discloses a transducer apparatus and a method of forming the transducer apparatus. A metal diaphragm is molecularly bonded to a ceramic material to form a ceramic surface thereof. A bridge circuit is then connected to the ceramic surface of the metal diaphragm. An input pressure port for pressure sensing is also provided in the configuration of U.S. Pat. No. 6,945,118, wherein the input pressure port is connected to the metal diaphragm to thereby form a transducer apparatus comprising the metal diaphragm, the bridge circuit and the input pressure port.

In the example of U.S. Pat. No. 6,945,118, the metal diaphragm is welded to the input pressure port. The metal diaphragm and the ceramic surface thereof preferably operate over a temperature of range of at least approximately −40° C. to 150° C., as does the transducer apparatus. The ceramic material is molecularly bonded to the metal diaphragm to form the ceramic surface thereof. The ceramic surface bonded to the metal diaphragm can also be configured as a ceramic substrate. The ceramic surface provides corrosion protection to the metal diaphragm. The bridge circuit generally comprises a resistor network and provides an output proportional to the applied force. A flex circuit comprising an ASIC (Application Specific Integrated Circuit), associated circuitry and EMI protection provides signal conditioning, calibration and compensation. A snap on connector system comprising a plastic snap on lead frame and Z axis conductor material can be utilized for connecting the flex circuit to the bridge network which is located on the diaphragm.

When used as a low pressure sensor, the economical packaging of the transducer in a housing can provide an effective seal. Preventing related to the mounting and sealing of the transducer from influencing the output, however, can become problematic. This is caused, at least in part, by the significant difference in thermal expansion between the material used to form the transducer, e.g., silicon, ceramic or the like, and the housing of plastic or the like. A conventional sealing arrangement involves placement of a ring of sealing material around an inlet pressure port in a housing and mounting the transducer so that the pressure sensitive diaphragm is precisely aligned with the pressure port. This conventional arrangement not only involves stress isolation issues, it also limits flexibility in design choices in defining the location of the transducer within the package.

FIG. 1 illustrates a pictorial diagram of the prior art welding of a diaphragm 102 to a port 104. FIG. 2 illustrates an isometric view of the prior art connection of the diaphragm 102 to port 104. FIG. 3 illustrates a cross sectional side view of the diaphragm 102 and port 104 depicted in FIGS. 1-2. Note that in FIGS. 1-3 identical or similar parts are generally indicated by identical reference numerals. The diaphragm 102 welded to port 104 is not sufficient for extreme pressure conditions, such as, for example, environments operating under pressure of up to 3000 Bar (i.e., 43,500 psi). The integrity of a welded construction such as that depicted in FIGS. 1-3 is a source of reliability concern during validation life testing. The style of sensor design depicted in FIGS. 1-3 is thus not adequate for ultra high pressure applications.

One of the major problems with pressure transducer devices, including those that utilize diaphragm or diaphragm portion configurations, is that such devices are not reliable in corrosive and high-temperature applications. A need therefore exists for a low-cost high accuracy pressure transducer that can be used in corrosive media and high-temperature applications.

BRIEF SUMMARY

The following summary is provided to facilitate an understanding of some of the innovative features unique to the embodiments and is not intended to be a full description. A full appreciation of the various aspects of the present invention can be gained by taking the entire specification, claims, drawings, and abstract as a whole.

It is, therefore, one aspect of the present invention to provide an apparatus and a method which overcomes the above noted prior art limitations.

It another aspect of the present invention to provide an improved sensor apparatus and method.

It is an additional aspect of the present invention to provide for an improved pressure sensor method and apparatus, which can be formed utilizing ATF (Advanced Thick Film) processes and techniques.

The aforementioned aspects of the invention and other objectives and advantages can now be achieved as described herein. A method and apparatus for configuring a pressure sensor is disclosed. In general, a homogeneous piece of metal is provided. A pressure port and a machined diaphragm are integrated onto the homogeneous piece of metal, wherein the machined diaphragm is connected to the pressure port. The machined diaphragm can be configured utilizing Advanced Thick Film (ATF) technology, thereby providing a high-pressure pressure sensor for use in high-pressure sensing application based on the pressure port and the machined diaphragm and related pressure sensor components thereof.

A gasket seal can be provided between the diaphragm and the pressure port to form a port-diaphragm assembly for the pressure sensor. Additionally, a flex assembly and an ESD clip can be provided, wherein the ESD clip is connected to the flex assembly. The flex assembly can then be attached to a connector and a snap cap attached to the flex assembly. A conductor can also be inserted between the diaphragm and the snap cap and the snap cap attached to the diaphragm. The ESD clip can be attached to the pressure port and the flex assembly. The pressure sensor can be finally formed by crimping the cover to the pressure port. A cable can also be connected to the cover. An end cap can also be attached to the cover, wherein the end cap is filled with an epoxy for connecting the end cap to the cover.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 4:
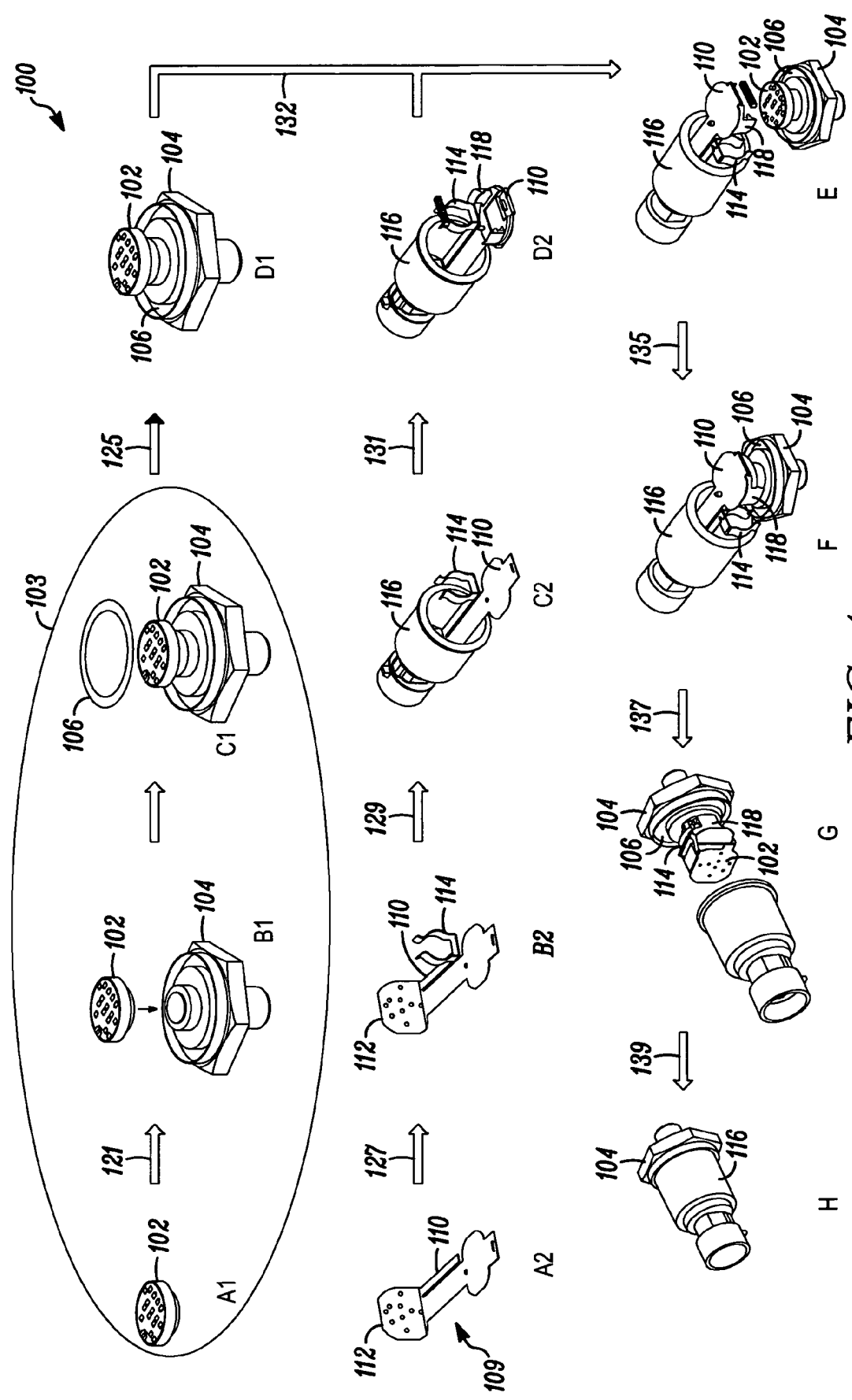
FIG. 4 illustrates a process for forming a pressure sensor.
Figure 5:
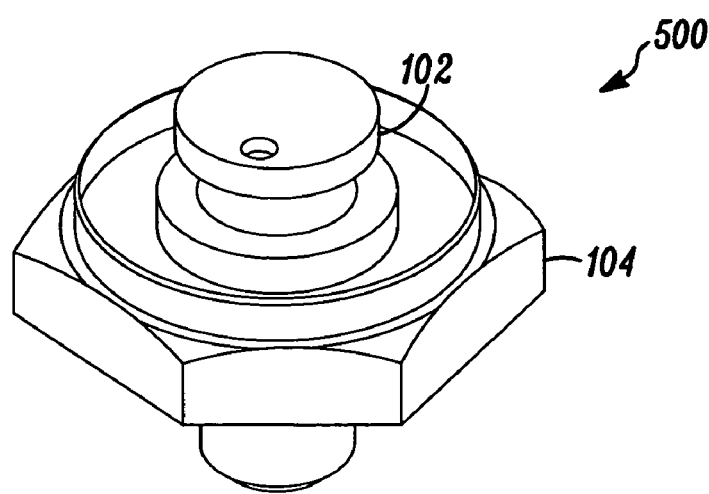
FIG. 5 illustrates an isometric view of an integrated diaphragm and port, which can be implemented in accordance with a preferred embodiment.
Figure 6:
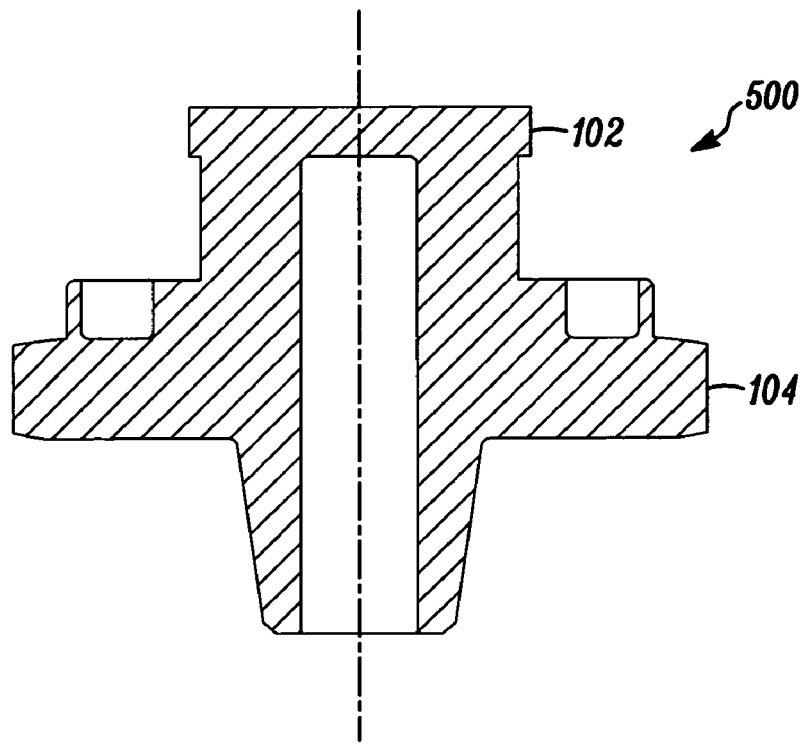
FIG. 6 illustrates a cross-sectional view of the integrated diaphragm and port depicted in FIG. 5, in accordance with a preferred embodiment.

FIG. 4 illustrates a process 100 for forming a pressure sensor. As indicated at step A1 in FIG. 1, an Advanced Thick Film (ATF) diaphragm 102 can be provided. Note that as utilized therein the term "ATF" and "Advanced Thick Film" refers generally to a technology based on a modular construction process for easy customization. An example of such ATF technology is disclosed in U.S. Pat. No. 6,945,118 discussed earlier. In general, ATF technology is extremely reliable and compatible with a wide range of fluids and gases. As indicated by arrow 121 and step B1, the diaphragm 102 can be welded to a pressure port 104. Note that the actual welding process is depicted within the bounds of circular line 103. The configuration depicted in FIGS. 5-6 is intended to replace the need for the welding process depicted within circular line 103. As depicted by arrow 123 and step C1, a gasket seal 106 can be installed over the diaphragm 102 and within the pressure port 104. That is, the gasket seal 106 is located between the diaphragm 102 and the pressure port 104. Thereafter, as indicated by arrow 125 and step C1, a port-diaphragm assembly 105 can be configured, which includes the diaphragm 102, the gasket seal 106 and the pressure port 104.

Figure 1:
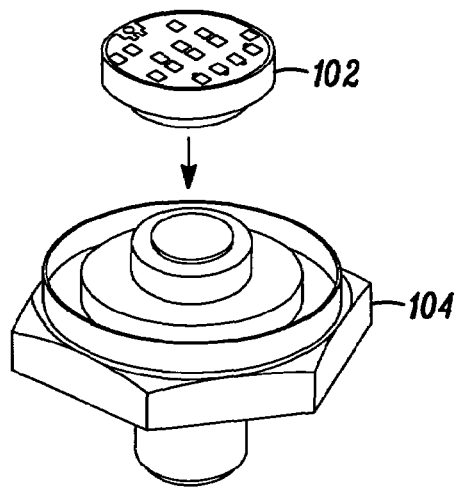
FIG. 1 illustrates a pictorial diagram of the prior art welding to a port.

Prior, simultaneously or following processing of steps A1, B1, C1, and D1 of FIG. 1, a variety of other steps A2, B2, C2, and D2 can also be implemented. Thus, as indicated at step A2, a populated flex assembly 109 composed of flex assembly portions 110, 112 can be provided. Thereafter, as indicated by arrow 127 and step B2, an ESD clip 114 can be connected to the flex assembly 109. The ESD clip 114 can be, for example, soldered to the flex assembly 109, depending upon design considerations. Next, as indicated by arrow 129 and step C2, a connector 116 can be provided and the flex assembly 109 and the ESD clip 114 connected to the connector 116. Thereafter, as indicated by arrow 131 and step D2, a snap cap 118 can be provided. The snap cap 118 can be heat staked to the flex assembly 109 as indicated at step D2. Following processing of steps A1-D1 and A2-D2, the continuing process 200 depicted in FIG. 2 can be implemented. Arrow 132 indicated in FIG. 1 indicates that the process depicted in FIG. 2 should now be implemented, beginning with step E.

Figure 2:
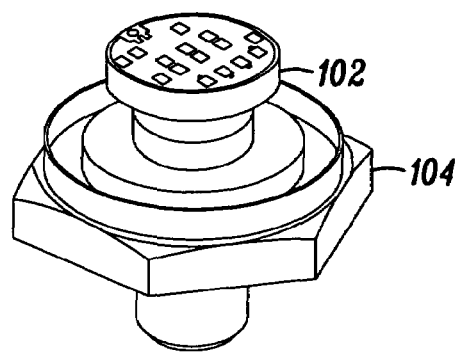
FIG. 2 illustrates an isometric view of the prior art connection of the diaphragm to the port depicted in FIG. 1.

As depicted at step E in FIG. 2 a Z-axis conductor can be inserted between the diaphragm 102 and the snap cap 118. Thereafter, as indicated by arrow 135, the process depicted at step F can be implemented, wherein the snap cap 118 is attached to the diaphragm 102. Following processing of the operation depicted at step F, the operation depicted at step G can be implemented as indicated following arrow 137. In step G, the ESD clip 114 can be attached to the port 104 and the flex assembly 109 can be folded into the connector 116. Finally, as illustrated by arrow 139 and step H, the port 104 can be crimped to the connector or cover 116.

The operations described in FIG. 4 and the resulting pressure sensor apparatus can be leveraged into a single piece port design where the port 104, 304 and diaphragm 102, 302 are integrated into the same homogeneous piece of metal provided by the flex assembly 109. This single piece port design is depicted in FIGS. 5-6. The design of FIGS. 5-6 instead of screen printing and firing thick film piezoresistors onto a diaphragm and subsequently welding the completed diaphragm to a port, employs ATF technology for processing directly on to a single piece port 104, 304, thereby eliminating the need for a welding process. This design is optimal for high pressure applications because it provides for a weldless configuration while leveraging ATF technology.

FIG. 5 illustrates an isometric view of an integrated diaphragm 102 and port 104 configuration 500, which can be implemented in accordance with a preferred embodiment. FIG. 6 illustrates a cross-sectional view of the integrated diaphragm 102 and port 104 configuration 500 depicted in FIG. 5, in accordance with a preferred embodiment. Note that in FIGS. 5-6, identical or missing parts or elements are generally indicated by reference numerals. The configuration 500 depicted in FIGS. 5-6 leverages a single piece port design where the port 104 and the diaphragm 102 are integrated into the same homogeneous pieces of metal. The single piece port design of FIGS. 5-6 can be utilized for ultra high pressure sensor designs and can replace the welding process depicted within the bounds of circular line 103 depicted in FIG. 4.

Figure 3:
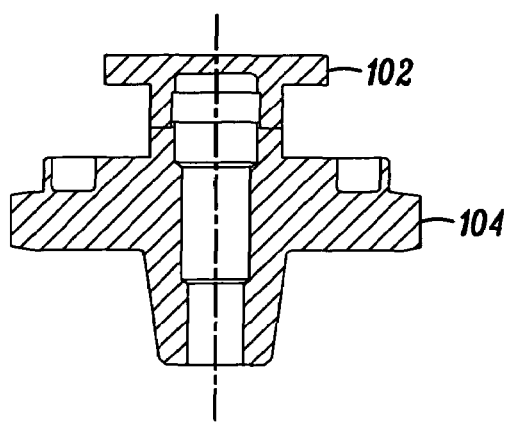
FIG. 3 illustrates a cross sectional side view of the prior art diaphragm and port configuration depicted in FIGS. 1-2.

The configuration 500 can be implemented based on Advanced Thick Film (ATF) pressure sensing technology. Instead of screen printing and firing thick film piezoresistors on a diaphragm and subsequently welding the completed diaphragm to a port, which is the case with prior art configuration of FIGS. 1-3 and the process depicted within line 103, ATF technology can be processed directly onto a single piece pressure port, thus eliminating the need for a welding process. The design of configuration 500 is therefore optimal for high pressure opportunities because is based on a weldless construction and leverages the use of ATF technology. Configuration 500 can thus constitute a pressure sensor based on the use of a homogeneous piece of metal. The pressure port 104 and the diaphragm 102 are integrated onto the homogeneous piece of metal to thereby provide a pressure sensor 500 based on the pressure port 104 and the diaphragm 102 and related pressure sensor components thereof.

It is contemplated that the use of the present invention can involve components having different characteristics. It is intended that the scope of the present invention be defined by the claims appended hereto, giving full cognizance to equivalents in all respects.

What is claimed is:

1. A method for configuring a pressure sensor, comprising:
providing a homogeneous piece of metal;
integrating a pressure port and a diaphragm onto said homogeneous piece of metal to thereby provide a pressure sensor based on said pressure port and said diaphragm and related pressure sensor components thereof.

2. The method of claim 1 wherein said diaphragm is configured utilizing Advanced Thick Film (ATF) technology.

3. The method of claim 1 further comprising:
connecting said diaphragm to said pressure port;
installing a gasket seal between said diaphragm and said pressure port to form a port-diaphragm assembly for said pressure sensor.

4. The method of claim 3 further comprising:
providing a flex assembly and an ESD clip;
connecting said ESD clip to said flex assembly;
thereafter attaching said flex assembly to a connector;
and attaching a snap cap to said flex assembly.

5. The method of claim 4 further comprising:
inserting a conductor between said diaphragm and said snap cap;
attaching said snap cap to said diaphragm;
attaching said ESD clip to said pressure port and said flex assembly; and
forming said pressure sensor by crimping a cover to said pressure port.

6. The method of claim 5 further comprising:
connecting a cable to said connector; and
connecting an end cap to said cover that is filled with an epoxy for connecting said end cap to said cover.

7. The method of claim 1 wherein said diaphragm comprises a machined diaphragm.

8. The method of claim 1 wherein said pressure apparatus comprises a high-pressure sensor for use in high-pressure sensing applications.

9. A method for configuring a pressure sensor, comprising:
providing a homogeneous piece of metal;
integrating a pressure port and a machined diaphragm onto said homogeneous piece of metal, wherein said machined diaphragm is connected to said pressure port, wherein said machined diaphragm is configured utilizing Advanced Thick Film (ATF) technology, thereby providing a high-pressure pressure sensor for use in high-pressure sensing application based on said pressure port and said machined diaphragm and related pressure sensor components thereof.

10. The method of claim 9 further comprising installing a gasket seal between said diaphragm and said pressure port to form a port-diaphragm assembly for said pressure sensor.

11. The method of claim 10 further comprising:
providing a flex assembly and an ESD clip;
connecting said ESD clip to said flex assembly;
thereafter attaching said flex assembly to a connector;
and attaching a snap cap to said flex assembly.

12. The method of claim 11 further comprising:
inserting a conductor between said diaphragm and said snap cap;
attaching said snap cap to said diaphragm;
attaching said ESD clip to said pressure port and said flex assembly; and
forming said pressure sensor by crimping a cover to said pressure port.

13. The method of claim 12 further comprising: connecting a cable to said connector; and
connecting an end cap to said cover that is filled with an epoxy for connecting said end cap to said cover.

14. A pressure sensor apparatus, comprising:
a homogeneous piece of metal;
a pressure port and a diaphragm integrated onto said homogeneous piece of metal to thereby provide a pressure sensor based on said pressure port and said diaphragm and related pressure sensor components thereof.

15. The apparatus of claim 14 wherein said diaphragm is configured utilizing Advanced Thick Film (ATF) technology.

16. The apparatus of claim 14 wherein:
said diaphragm is connected to said pressure port;
a gasket seal is located and installed between said diaphragm and said pressure port to form a port-diaphragm assembly for said pressure sensor.

17. The apparatus of claim 16 further comprising:
a flex assembly and an ESD clip, wherein said ESD clip is connected to said flex assembly;

a connector attached to said flex assembly; and
a snap cap attached to said flex assembly.

18. The apparatus of claim 17 further comprising:
a conductor inserted between said diaphragm and said snap cap, wherein said snap cap is attached to said diaphragm and wherein said ESD clip is attached to said pressure port and said flex assembly; and
a cover crimped to said pressure port to form said pressure sensor.

19. The apparatus of claim 18 further comprising: a cable connected to said connector; and
an end cap attached to said cover, wherein said end cap is filled with an epoxy for connecting said end cap to said cover.

20. The apparatus of claim 12 wherein said diaphragm comprises a machined diaphragm.

* * * * *